(No Model.) 2 Sheets—Sheet 2.
G. H. KANMACHER.
EXCAVATING ELEVATOR.
No. 297,410. Patented Apr. 22, 1884.
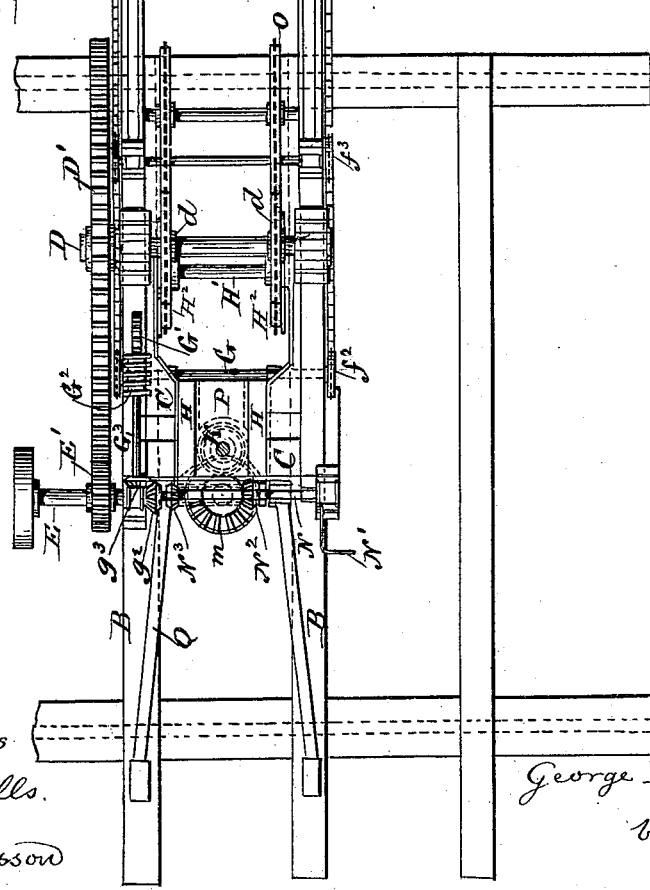
Witnesses
L. C. Hills.
W. B. Masson
Inventor
George H. Kanmacher
by E. E. Masson
atty.

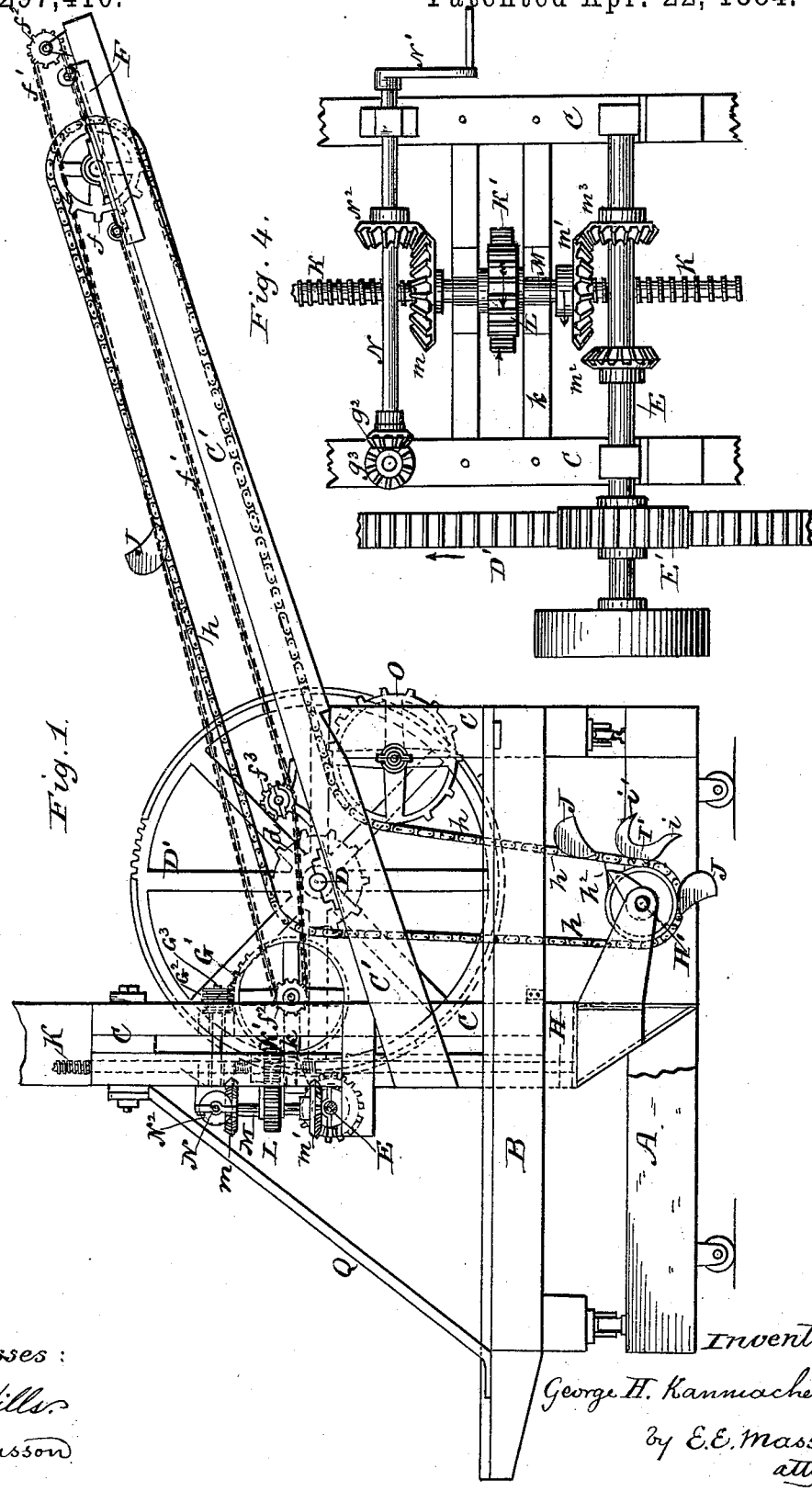

stat
UNITED STATES PATENT OFFICE.

GEORGE H. KANMACHER, OF COLUMBUS, OHIO.

EXCAVATING-ELEVATOR.

SPECIFICATION forming part of Letters Patent No. 297,410, dated April 22, 1884.

Application filed July 12, 1883. (No model.)

*To all whom it may concern:*

Be it known that I, GEORGE H. KANMACHER, a citizen of the United States, residing at Columbus, in the county of Franklin and State of Ohio, have invented certain new and useful Improvements in Excavating-Elevators, of which the following is a specification, reference being had therein to the acccompanying drawings, in which—

Figure 1 is a side elevation of an excavator constructed in accordance with my invention. Fig. 2 is a plan of the same. Fig. 3 is a top view of the main chains and excavating-tools. Fig. 4 is a front view, showing the operating-gears in position.

Like letters refer to like parts in all the figures.

A represents a lower truck, adapted to move in one direction, and B an upper truck mounted upon the lower truck, and adapted to move in a direction at right angles to that in which the lower truck moves.

Mounted upon or formed as a part of the upper truck is a frame-work comprising uprights C C, adapted, with a boom, C', composed of two parallel pieces, united at their outer ends, to serve, as hereinafter described, in the arrangement and construction of the operative mechanism employed.

A main shaft, D, extends across the frame-work, and is journaled therein and carries sprocket-wheels $d\ d$, and a master gear-wheel, D'. A counter-shaft, E, carries a pinion, E', which meshes with the master-gear, so that when the shaft E is connected with any suitable motor—as an engine located on the truck B or not, as desired—the entire apparatus is operated as hereinafter described.

F is a car mounted on the tracks $c$ on the boom C', and provided with a cross-shaft, F', carrying the sprockets $f$, and to the front and rear ends of the car, and at each side thereof, are secured sprocket-chains $f'$, which pass from the front end under and around sprockets $f^2$, secured to the outer end of the boom, and from thence over sprockets $f^2$ on a shaft, G, on one end of which is a worm-gear, G', operated by a worm, $G^2$, on a shaft, $G^3$, which is rotated by means of a bevel-gear meshing into a companion on the shaft. From the sprockets $f^2$ the chains $f'$ pass under idler-sprockets $f^3$, and from thence to the back end of the car, as shown.

Within the uprights C C is a slide, H, which is provided with suitable brackets in which are bearings for a shaft, H', which carries plain wheels $H^2$, (having a flange on the outside,) though preferably smaller than the sprockets $d$; or it may carry simply a roll about which endless sprocket-chains $h\ h$ pass at each end thereof, said chains being arranged at each side of the boom and passing over the sprockets $d$ and $f$. Cross-pieces I (see Fig. 3) are secured diagonally to the chains, and on each is secured the picks I', each of which is constructed with two operative points, $i\ i'$, the latter projecting from the cross-piece a greater distance than the former, so that, as during the revolution of the wheels $H^2$ and shaft H', the first point of each pick loosens the earth for a certain depth, the following point of the same pick enters more deeply, and as all the picks on each cross-piece are arranged diagonally with it, the several picks operate successively rather than in unison, as heretofore, whereby the whole force of the motor may be brought to effective operation upon a single pick, and thus the work of excavating is subdivided into smaller amounts, rapidly accomplished, which requires less motive power. Following each cross-bar I, carrying picks, is a scoop or shovel, J, secured crosswise between and at right angles to the chains $h\ h$.

Now, it will be seen that by rotating the shaft D the picks and scoops operate, the first to loosen, the second to take up and elevate the earth, carrying it along and over the boom until the sprockets $f$ on the car F are reached, when the scoops, in passing from the upper to the lower sides of said sprockets, deliver the earth into any suitable receptacle or car or upon the earth. It now remains to adapt the apparatus to present the lower wheel's shaft H', and the picks and scoops passing thereabout, close to the earth as the excavation proceeds. This adaptation involves, also, means for bringing the car F nearer the shaft D, because the chains $h\ h$ are endless. In a manner hereinafter described I accomplish this object and operation, and that automatically.

A screw, K, is arranged vertically in the slide H, and is moved with it by means of a geared nut, K', prevented from running down the screw by means of the shelf-bracket of framing k within the uprights C, and prevented from running up the screw by the weight of the slide and its adjuncts; or it may be by similar framing to k. A gear, L, meshes with the nut K', and is mounted on a vertical shaft, M, having a pinion, m, at its upper end. The horizontal shaft N carries a sliding bevel-gear, $N^2$, and is provided with a crank, and is geared to the shaft $G^3$, which carries the worm $G^2$, by bevel-gears $g^2$ $g^3$, the latter being on said worm-shaft. At the lower end of shaft M is a bevel-gear, $m'$, and on the shaft E are two sliding bevel-gears, $m^2$ $m^3$, by which motion is given to the shaft M in either direction at will.

O O are idlers, over which the chains h h pass on their way to the roll or shaft H'. Now, it will be seen that as the shaft E is revolved in one direction continuously, the employment of one of the bevel-gears $m^2$ $m^3$ to communicate said motion to the shaft M will cause it to revolve in one direction, and hence (as shown by arrows in Fig. 4) cause the nut to revolve, so as to depress the screw K, which requires the drawing of the car F toward it; and this is accomplished by the meshing of the gear $N^2$ with the gear $m$; and hence, the entire train of gearing of the whole apparatus being properly proportioned, just as far as the slides and picks descend, so far the car is automatically brought toward the screw and slide and along the boom. So, also, when the slide and screw is elevated by substituting gear $m^2$ for the gear $m^3$, as a means of communicating the motion of shaft E to shaft M in the opposite direction, the gear $N^2$ and shaft N are also reversed in the direction of this movement, and hence the worm $G^2$ is reversed and the car drawn away from the screw and slide. By throwing out or unmeshing the gear $m^2$ $m^3$, the upright shaft may be fed by hand by means of the crank N', if operating on stony ground.

I do not wish to be understood as limiting myself to the exact proportion of the parts herein shown, nor to the exact train of gearing employed, as various changes may be made in these particulars without departing from the spirit of my invention.

The vertical slide is preferably made of two beams, one on each side, and the space between them may be employed or occupied by braces or filling of cast or other metal, as P, and suitable braces, as Q, may be employed to strengthen the uprights C C.

Over a portion of the wheels $H^2$ are placed shields $h^2$, Fig. 2, so that if any stones, gravel, &c., elevated by the scoops should fall therefrom they are prevented from lodging between the periphery of these wheels and the chains h.

Having described my invention and its operation, what I claim as new, and desire to secure by Letters Patent, is—

1. In an excavator, the combination of the main shaft provided with sprockets, a counter-shaft, G, provided with sprockets, endless chains carrying, separately secured thereto, excavating and elevating devices, a car, adapted to ride the boom, and means for rotating the main shaft continuously in one direction and the counter-shaft in either direction, at will, substantially as and for the purpose set forth.

2. The combination of a vertical slide, a screw and gears for elevating and depressing the same, and the endless chain $f'$, secured to the car F and operated through gearing and worm-wheel from the driving-shaft, for automatically and proportionately varying the position of the car carrying excavating chain-sprockets, substantially as specified.

3. In an excavating-machine, the combination of an endless chain and a pick having two operative points, the rear one of which is projected farther from its base than the forward one, substantially as specified.

4. In an excavator, a series of picks, arranged diagonally upon the sprocket-chains, in combination with scoops, substantially as shown and described.

5. The combination of the shaft D, provided with sprockets $d$, car F, provided with sprockets $f$, idler O, vertical slide H, shaft H', carried by brackets upon the slide, shaft G, worm-gear G', sprockets $f^2$, chains $f'$ and $h$, and means for rotating said shafts, substantially as shown and described.

6. The combination of the slide H, screw K, nut K', gear L, and shaft E, provided with interchangeable gears $m^2$ $m^3$, with gears E' D', and an endless chain having picks and scoops, substantially as shown and described.

7. The combination of horizontal shaft E, gears $m^2$ $m^3$, vertical shaft M, gears $m$ $m'$, shaft N, gears $N^2$ $g^2$ thereon, gears $g^3$ and worm $G^2$, and car carrying endless chain, substantially as shown and described.

8. The combination of the chains h h, diagonal cross-bar I, picks I', and scoops or shovels J, substantially as shown and described.

In testimony whereof I affix my signature in presence of two witnesses.

GEORGE H. KANMACHER.

Witnesses:
J. J. GRIGDE, Jr.,
J. J. HOFFMANN.